3,482,962
TREATMENT OF DECIDUOUS FRUIT TREES
Armand August Florent Busschots, St. Truiden, Belgium, assignor to Janssen Pharmaceutica, a corporation of Belgium
No Drawing. Filed May 8, 1967, Ser. No. 636,590
Int. Cl. A01n 5/00
U.S. Cl. 71—122                          4 Claims

ABSTRACT OF THE DISCLOSURE

Deciduous fruit trees are treated with aqueous compositions containing di-(p-chlorophenyl)-cyclopropyl-methanol whereby an increase in dimensions of the fruit is obtained.

---

This invention relates to the chemical treatment of deciduous fruit trees, and, more particularly, to the treatment of such trees with compositions containing di-(p-chlorophenyl)-cyclopropyl-methanol whereby the growth of fruit is beneficially affected.

Di-(p-chlorophenyl)-cyclopropyl-methanol has been reported in the literature: Helv. Chim. Acta, 37, 2230 (1954). It is a white, crystalline product; M.P. about 63° C.; density 1.26; and soluble at ordinary temperatures as follows: 0.27% in water (pH 6.7), 6% in heptane, 17% in petroleum, and more than 50% in such organic solvents as benzene, toluene, xylene, ethylbenzene, cumene, chlorobenzene, bromobenzene, carbon tetrachloride, dichloroethylene, isopropyl alcohol, acetone and methyl ethyl ketone. Toxicologically, it has an $LD_{50}$ in rats of 1600 mg./kg., and of more than 1000 mg./kg. in dogs. Its use as an arachnicide and fungicide has been described in U.S. Pat. No. 3,287,213.

It has now been found that an increase in the average weight of fruit obtained from deciduous fruit trees, for example, trees bearing apples, peaches, pears and the like, and an increase in the size of such fruit is obtained, without damage to the fruit, the foliage or vigor of the trees, by the application of aqueous suspensions containing concentrations of the order of 200 to 400 p.p.m. of di-(p-chlorophenyl)-cyclopropyl-methanol to such trees. The trees are sprayed at any time between the setting of the fruit and the end of the growing period.

Due to the limited solubility of di-(p-chlorophenyl)-cyclopropyl-methanol in water, its use as a growth regulator is preferably in the form of an aqueous suspension. Thus, the compound may be formulated with any conventional suspending agent, or it may be formulated as a wettable powder by combination with any conventional powdery adjuvant and a dispersing agent, or it may be formulated as a concentrate in a suitable organic solvent such as, for example, heptane, petroleum, benzene, toluene, xylene, chlorobenzene, carbon tetrachloride, isopropyl alcohol, acetone and the like, which may then be made up into suspensions of the desired concentrations with water. Suspension concentrations of the order of 200 to 400 p.p.m. of di-(p-chlorophenyl)-cyclopropyl-methanol may be generally employed.

It is also been found that an increase in fruit size is obtained when di-(p-chlorophenyl)-cyclopropyl-methanol is used in admixture with at least one other pesticide. The amount of such other pesticide employed is generally within that range which has been recommended for the pesticidal activity of the particular material, and, generally, from 0.01 to 0.5 percent of the final formulation has been found to be quite suitable. This effect is observed with pesticides of varying structure and class as exemplified hereinbelow.

The following examples are intended to illustrate, but not to limit, the scope of the present invention.

Example I

The following formulation is typical for a wettable powder which may be diluted with water to the desired concentration of the growth regulator.

|  | Percent |
|---|---|
| Di-(p-chlorophenyl)-cyclopropyl-methanol | 35 |
| Marasperse ® BX 78 (group of lignin sulfonic acid compounds used as dispersing agent—Antara Chemicals) | 3 |
| Antaron ® L-175 (an alkyl amide sulfonite wetting agent—Antara Chemicals) | 2 |
| Attaclay ® (clay diluent for wettable powders—Attaplugus Clay Co.) | 60 |

(97–99% passing the U.S.A. Nr. 20 sieve.)

Example II

The following example illustrates the increase in the size of fruit obtained when apple trees are treated with di-(p-chlorophenyl)-cyclopropyl-methanol ("DCCM"). The wettable powder of Example I is diluted with sufficient water to form a 0.1% suspension (ie.., 350 p.p.m.) of DCCM. Also prepared are similar suspensions of the various pesticides listed below to the concentration level specified, with and without 350 p.p.m. of DCCM. Each suspension is sprayed onto a total of six apple trees (Golden Delicious) at any time between the setting of the fruit and the end of the growing period. The data in Table I represent the average percentages of apples from the grouping of six trees after maturation which have a diameter of more than 80 mm.

Pesticide:                   Description
 A _____ Tetramethylthiuram disulphide (fungicide).
 B _____ "Tuzet"—trade name (Farbenfabriken Bayer) for fungicidal preparation containing about 40% tetramethylthiuram disulphide, 20% zinc dimethyldithiocarbamate and 20% methyl arsinebis(dimethyldithiocarbamate).
 C _____ Sulphur, dispersible powder (fungicide).
 D _____ O,O - dimethyl S-(4-oxo-benzotriazino-3-methyl) - phosphorodithioate (insecticide).

Pesticide: Description
- E ..... Methyl parathion (insecticide).
- F ..... N-(dimethylaminosulphonyl) - N - (fluorodichloromethylthio) - aniline (insecticide).
- G ..... N - trichloromethylthiotetrahydrophthalimide (fungicide).
- H ..... 6,7,8,9,10,10 - hexachloro - 1,5,5a,6,9,9a-hexahydro - 6,9 - methano-2,4,3-benzodioxathiepin-3-oxide (insecticide).
- I ..... 2 - isopropoxyphenyl-N-methylcarbamate (agent against termites).
- J ..... 2,2 - bis(p - chlorophenyl) 1,1,1-trichloroethane (insecticide).

TABLE I

| Suspension | Avg. percent of apples>80 mm. | Percent increase |
|---|---|---|
| 0.16% A | 24.0 | |
| 0.016% A plus 0.035% DCCM | 31.4 | 30.8 |
| 0.08% B | 16.2 | |
| 0.08% B plus 0.035% DCCM | 26.2 | 61.7 |
| 0.27% C | 15.0 | |
| 0.27% C plus 0.035% DCCM | 20.0 | 66.7 |
| 0.037% D | 19.0 | |
| 0.037% D plus 0.035% DCCM | 29.2 | 53.7 |
| 0.03% E | 20.3 | |
| 0.03% E plus 0.035% DCCM | 29.4 | 44.8 |
| 0.05% F | 21.6 | |
| 0.05% F plus 0.035% DCCM | 28.6 | 32.4 |
| 0.1% G | 17.4 | |
| 0.1% G plus 0.035% DCCM | 23.0 | 32.2 |
| 0.05% H | 25.3 | |
| 0.05% H plus 0.035% DCCM | 29.2 | 15.4 |
| 0.1% I | 22.5 | |
| 0.1% I 0.035% DCCM | 28.4 | 26.2 |
| 0.1% J | 19.5 | |
| 0.1% J plus 0.035% DCCM | 25.5 | 30.8 |
| Mean | 20.1 | |
| 0.035% DCCM | 27.8 | 38.5 |

Example III

The following experiment demonstrates the increase in the weight of fruit obtained when di-(p-chlorophenyl)-cyclopropyl-methanol is used as a growth regulator. The results tabulated below were accumulated after treatment of six apple trees (Golden Delicious) according to Example II. After maturation, the average weight of 200 randomly selected apples taken from the grouping of six trees is measured. In comparision with other known pesticides, the fruit trees sprayed with DCCM showed an average increase of about ten percent.

TABLE II

| Suspension: | Avg. wt. (grams) of 200 apples |
|---|---|
| 0.16% A | 170 |
| 0.08% B | 173 |
| 0.27% C | 164 |
| 0.037% D | 168 |
| 0.03% E | 165 |
| 0.05% F | 180 |
| 0.1% G | 175 |
| 0.05% H | 186 |
| 0.1% I | 185 |
| 0.1% J | 177 |
| 0.035% K [1] | 171 |
| Mean | 174 |
| 0.035% DCCM | 191 |

Increase over Mean=9.8%.

[1] Pesticide K=1,1-bis(p-chlorophenyl)-2,2,2-trichloroethanol (acaricide).

What is claimed is:
1. In the method of spraying deciduous fruit trees with an aqueous suspension comprising from about 200 to about 400 p.p.m. of di-(p-chlorophenyl)-cyclopropyl-methanol, the improvement which consists of spraying said trees in the period between the setting of the fruit and before the end of the growing period to thereby increase the size or weight of fruit obtained from said trees.

2. In the method of spraying deciduous fruit trees with an aqueous suspension comprising from about 200 to about 400 p.p.m. of di-(p-chlorophenyl)-cyclopropyl-methanol and a pesticidal amount of an additional pesticide, the improvement which consists of spraying said trees in the period between the setting of the fruit and before the end of the growing period to thereby increase the size or weight of fruit obtained from said trees.

3. The method of claim 1 wherein the trees are apple trees.

4. The method of claim 2 wherein the trees are apple trees.

References Cited

UNITED STATES PATENTS 3,287,213  11/1966  Busschots _____ 424—345

JAMES O. THOMAS, JR., Primary Examiner

PO-1050
(5/69)

UNITED STATES PATENT OFFICE
CERTIFICATE OF CORRECTION

Patent No. 3,482,962        Dated December 9, 1969

Inventor(s) Armand August Florent Busschots

It is certified that error appears in the above-identified patent and that said Letters Patent are hereby corrected as shown below:

In column 3, Table I, line 2 under "Suspension", the numeral "0.01 should read -- 0.16% --. Same column, under "Percent increase" the numerals "308" should read -- 30.8 --, and "38.5" should read -- 38.2 -

SIGNED AND
SEALED
MAY 12 1970

(SEAL)
Attest:

Edward M. Fletcher, Jr.
Attesting Officer

WILLIAM E. SCHUYLER, JR.
Commissioner of Patents